(12) United States Patent
Galperin (10) Patent No.: US 6,278,731 B1
(45) Date of Patent: Aug. 21, 2001

(54) DIGITAL TRANSMITTER EMPLOYING DIGITAL SIGNAL GENERATOR UTILIZING STORED WAVEFORMS

(75) Inventor: Victor Galperin, Kfar Saba (IL)

(73) Assignee: Shiron Advanced Communications Ltd, Petach Tikva ( * ) Notice: Subject to any disclaimer, the term of this patent is extended or adjusted under 35 U.S.C. 154(b) by 0 days.

(21) Appl. No.: 09/121,626

(22) Filed: Jul. 23, 1998

(51) Int. Cl.[7] .............................. H03K 5/159; H04L 25/03
(52) U.S. Cl. .............................................. 375/229; 375/296
(58) Field of Search ................................. 375/229, 230, 375/231, 232, 234, 295, 296; 333/18, 28 R (56) References Cited

U.S. PATENT DOCUMENTS

| | | | |
|---|---|---|---|
| 5,321,512 | * 6/1994 | Huang .................................. | 348/607 |
| 5,471,504 | * 11/1995 | Lee et al .............................. | 375/233 |
| 5,548,541 | 8/1996 | Bierman et al. ................. | 364/724.16 |
| 5,623,377 | * 4/1997 | Behrens et al. ....................... | 360/45 |
| 5,809,086 | * 9/1998 | Ariyavisitakul ..................... | 375/232 |
| 6,031,866 | * 2/2000 | Oler et al. ............................. | 375/219 |

OTHER PUBLICATIONS

Jianjun Wu et al., "A New Adaptive Equalizer with Channel Estimation for Mobile Radio Communications," IEEE Transactions on Vehicular Technology, vol. 45, No. 3, Aug. 1996, pp. 467–474.*

J.L Massey, Some New Approaches To Random—Access Communications , Reprinted from Performance ' 87, pp. 551–569,1988 P.J . Courtois and G.Latouche, Eds. New York : Elsevier Science , 1988, pp. 354–368.

J.L Massey and P. Mathys, " The Collision Channel Without Feedback," IEEE Trans. Inform. Theory , vol. IT –31, pp. 192–204, Mar. 1985.

N. Abramson, "Multiple Access in Wireless Digital Networks ," Proceedings of the IEEE. vol. 82 No. 9 Sep. 1994 pp. 1360–1370.

N. Abramson, VSAT Data Networks, in Proc. IEEE. vol. 78, No. 7, Jul. 1990, pp. 1267–1274.

M.B.Pursley , "Frequency—Hop Transmission for Satellite Packet Switching and Terrestrial Packet Radio Networks," IEEE Transactions on Information Theory, vol. IT–32 , No. 5, Sep. 1986, pp. 652–667.

(List continued on next page.)

*Primary Examiner*—Tesfaldet Bocure
(74) *Attorney, Agent, or Firm*—Eitan, Pearl, Latzer & Cohen-Zedek (57) ABSTRACT

A digital signal generator which can be utilized to provide an efficient way to implement a digital transmitter based on storage of waveforms in a memory device such as a ROM or PROM. Assuming a symbol rate of 1/T and a transmitter basic waveform having a duration 2NT, the digital signal generator presented herein reduces storage requirements by a factor of $2^{N+1}$ relative to prior art classical approaches which are typically memory based implementations. A shift register is employed into which the received digital data is input. The length of the shift register is 2N which represents the number of symbol periods of the output shaping waveform. The shift register is divided into precursor and postcursor portions for handling both past and future portions of the shaping waveform. An address generator circuit generates the address bits for a memory storage device from the output of the shift register. The storage device contains the digitized waveform samples to be transmitted. The present invention takes advantage of the fact that the shaping waveform is symmetrical around the y-axis and thus only ½ of the samples need be stored. In addition, since the input data is a real binary bit stream, the waveforms corresponding to '0' and '1' bits are inverted with respect to each other. Thus, only a single version of the shaping waveform need be stored, the other being generated by multiplying by –1.

19 Claims, 6 Drawing Sheets

OTHER PUBLICATIONS

K.Yang . and G. L. Stuber , " Throughput Analysis Of The Slotted Frequency –Hop Multiple–Access Network," IEEE Journal on Selected Areas in Communications . vol. 8 . No. 4, May 1990., pp. 588–601.

S. W. Kim and W. Stark , Optimum Rate Reed—Solomon Codes For Frequency Hopped Spread Spectrum Multiple Access Communication Systems. IEEE Transactions on Communications , vol. 37, No. 2 Feb. 1989, pp. 138–144.

Amir M. Y. Bigloo, T. A Gulliver and V.K. Bhargava , "A Slotted Frequency –Hopped Multiple–Access Network with Packet Combining ," IEEE Journal on Selected Areas in Communications, vol. 14, No. 9 , Dec. 1996, pp. 1859–1865.

ETS 300 421 " Digital Broadcasting Systems for Television, Sound and Data Services; Framing Structure , Channel Coding and Modulation for 11/12 GHz Satellite Services" Dec. , 1994.

S. B. Wicker V. K. Bhargava, " Reed Solomon Codes and Their Applications ", IEEE Press, 1992 chapter 6.

S. Laufer and J. Snyders, Feedforward Multiple Access Satellite Communications, IEEE Journal On Selected Areas In Communications, vol. 10, No.6 , Aug. 1992 pp. 1003–1011.

* cited by examiner

DIGITAL TRANSMITTER EMPLOYING DIGITAL SIGNAL GENERATOR UTILIZING STORED WAVEFORMS

FIELD OF THE INVENTION

The present invention relates generally to data communication and more particularly relates to a digital transmitter utilizing a digital signal generator and associated stored waveforms.

BACKGROUND OF THE INVENTION

Digital data communication systems are currently enjoying widespread use due to their benefits over analog communication systems. Typically, most data communication systems utilize filters in generating the data to be transmitted. Filters are especially used in communication systems that employ modems to transmit digital data over analog transport facilities. Most modems include wave shaping circuitry for generating appropriate signals for transmission over the analog communication channel. Note that the analog communication channel may comprise copper, waveguide, optical fiber, RF, microwave, IR, etc.

The function of the modem is to accept the digital data to be transmitted and generate analog signals suitable therefrom for transmission over the analog communication channel. To perform this function, modems employ wave shaping circuitry to first shape the input digital waveform and subsequently modulate this waveform with a carrier frequency signal. The wave shaping is performed to provide the transmitted signal with spectral characteristics suitable to the particular communication channel the data is to be transmitted on.

The shaping circuitry used in prior art transmission systems typically utilized large amounts of memory storage to store the waveform to be used in shaping the input digital data U.S. Pat. No. 5,548,541, issued to Bierman et al. teaches a finite impulse response (FIR) filter for shaping a one bit serial digital data pulse train. The filter employs a delay element for sequentially receiving binary data bits in the data pulse train at fixed data cycle intervals and outputting simultaneously in parallel a plurality of data bits representing the most recent history of the past N data cycle intervals. Also included is a sample element for sampling the pulse train and a memory device for storing output values.

With this type of system, as the number of samples for each symbol increases, the memory required for storage of the waveform also increases by a large amount. Thus, there is a need for a communication system which reduces the storage requirements for a given number of waveform samples per symbol.

SUMMARY OF THE INVENTION

The present invention is a digital signal generator (digital data generator) which can be utilized to provide an efficient way to implement a digital transmitter based on storage of waveforms in a memory device such as a ROM or PROM. Assuming a symbol rate of 1T and a transmitter basic waveform having a duration 2NT, the digital signal generator presented herein reduces storage requirements by a factor of $2^{N+1}$ relative to prior art classical approaches which are typically memory based, e.g., ROM or RAM implementations.

The digital data generator employs a shift register into which the received digital data is input. The length of the shift register is 2N which represents the number of symbol periods of the output shaping waveform. For example, if the symbol period is denoted by T, the shaping waveform may span 8 symbol periods. Thus, the length of the shift register in this example would be 8 and N would equal 4.

The shift register is divided into precursor and postcursor portions since the shaping waveform typically comprises both past and future portions. To accommodate the future portion of the shaping waveform, the data transmitted at any time t corresponds to the center of the shift register with equal size data considered for the precursor and the postcurcor portions.

The output of the shift register is input to an address generator circuit which outputs the address bits for input to a memory storage device such as a ROM or PROM. A counter functions to count modulo the number of samples per symbol. The output of the memory storage device is further processed to yield the digital output signal.

Due to the independence of the postcursor and precursor contributions to the output waveform, the output waveforms for the precursor and postcursor portions of the shift register can be divided into two parts and generated independently. Thus, a reduction in the amount of memory storage required may be achieved by storing waveform data only for either the postcursor or the precursor. In this case, the same storage device is used but the addresses is alternatively applied for the precursor and the postcursor. The postcursor and precursor outputs of the memory storage device are stored and the two output values are summed to generate the digital output data signal. Given that $n_s$ denotes the number of samples per symbol, this provides a reduction in the required memory space from $n_s \cdot 2^{2N}$ (the prior art requirement) to $2 \cdot n_s \cdot 2^N$ which represents a reduction by a factor of $$\frac{2^N}{2}.$$

In addition, advantage can be taken of the fact that the shaping waveform is mostly symmetrical around the y-axis (which is usually the case) and thus only ½ of the samples need be stored. This provides a reduction in the required memory space from $2 \cdot n_s \cdot 2^N$ to $n_s \cdot 2^N$ which represents a reduction by a factor of 2.

A further reduction in storage memory can be achieved by taking advantage of the substantial symmetry in amplitude of the waveform data. Since the input data is a real binary bit stream, the waveforms corresponding to '0' and '1' bits are inverted with respect to each other, e.g., +1 and −1. Thus, only a single version of the shaping waveform need be stored, the other being generated by multiplying by −1. This provides another reduction in the required memory space from $$n_s \cdot 2^N \text{ to } \frac{1}{2} n_s 2^N$$

which represents an additional reduction by a factor of 2.

In total, the present invention yields a reduction in memory storage requirements by a factor of $2^{N+1}$.

There is provided in accordance with the present invention a digital data generator for shaping an input digital data stream in accordance with a shaping waveform to yield a digital output data stream, the digital data generator comprising a delay element of length 2N wherein 2N represents the time duration of the shaping waveform, the delay element adapted to receive the input digital data stream and is divided into a precursor portion and a postcursor portion, an address generator for generating a precursor address in accordance with the precursor portion and a postcurcor address in accordance with the postcursor portion, a multiplexor for muxing the precursor address and the postcursor address to yield a first lookup address and a second lookup address during each sample cycle, lookup means operative to output a first value in accordance with the first lookup address and a second value in accordance with the second lookup address, summing means adapted to sum together the first value and the second value output from the lookup means to yield the digital data output stream and wherein the number of entries required in the lookup means is equal to $$\frac{n_s \cdot 2^N}{2},$$

where $n_s$ represents the number of samples per symbol and N represents ½ the number of periods of the shaping waveform.

There is also provided in accordance with the present invention a digital data generator for shaping an input digital data stream in accordance with a shaping waveform to yield a digital output data stream, the digital data generator comprising a delay element of length 2N wherein 2N represents the time duration of the shaping waveform, the delay element adapted to receive the input digital data stream and is divided into a precursor portion and a postcursor portion, an address generator for generating a precursor address in accordance with the precursor portion and a postcurcor address in accordance with the postcursor portion, lookup means operative to output a first value of a shaping waveform sample in accordance with the first lookup address and a second value of a shaping waveform sample in accordance with the second lookup address, summing means adapted to sum together the first value and the second value output from the lookup means to yield the digital data output stream and wherein the number of entries required in the lookup table is equal to $$\frac{n_s \cdot 2^N}{2},$$

where $n_s$ represents the number of samples per symbol and N represents ½ the number of periods of the shaping waveform.

The delay element may comprise a serial in/parallel out shift register and the address generator may comprise a precursor address generator and a postcursor address generator. The lookup means comprises a memory storage device which may utilize a random access memory (RAM) device, read only memory (ROM) device, programmable read only memory (PROM) device, Flash memory device, electrically erasable programmable read only memory (EEPROM) device or electrically programmable read only memory (EPROM) device.

There is further provided in accordance with the present invention, in a digital transmission system, a method of shaping an input digital data stream in accordance with a shaping waveform to yield a digital output data stream, the method comprising the steps of providing a lookup table of stored shaping waveform samples wherein the number of entries required in the lookup table is equal to $$\frac{n_s \cdot 2^N}{2},$$

where $n_s$ represents the number of samples per symbol and N represents ½ the number of periods of the shaping waveform, delaying the input digital data stream so as to form a precursor portion and a postcursor portion, looking up a precursor value from the lookup table in accordance with the precursor portion, looking up a postcursor value from the lookup table in accordance with the postcursor portion and summing the precursor value and the postcursor value to yield the digital data output stream.

There is also provided in accordance with the present invention a digital transmitter for transmitting a Binary Phase Shift Keying (BPSK) signal comprising a digital data generator for generating a digital output data stream in accordance with an input data stream and a pervasively stored shaping waveform, a digital to analog converter coupled to the output of the digital data generator, the digital to analog converter for converting a digital input signal into an analog output signal and up converter means for performing baseband to radio frequency (RF) conversion in response to the analog output signal and a local oscillator signal, the up converter amplifying and transmitting the RF signal.

There is still further provided in accordance with the present invention a digital transmitter for transmitting a Quadrature Phase Shift Keying (QPSK) signal comprising means for generating an I and a Q data stream from a source of input data, a first digital data generator for generating an I digital output data stream in accordance with the I data stream and a pervasively stored shaping waveform, a second digital data generator for generating a Q digital output data stream in accordance with the Q data stream and a pervasively stored shaping waveform, a first digital to analog converter coupled to the output of the first digital data generator, the first digital to analog converter for converting the I digital output data stream signal into an I analog output signal, a second digital to analog converter coupled to the output of the second digital data generator, the second digital to analog converter for converting the Q digital output data stream into a Q analog output signal and up converter means for performing baseband to radio frequency (RF) conversion on the I analog output signal, the Q analog output signal and a local oscillator signal, the up converter amplifying and transmitting the RF signal.

In addition, there is provided in accordance with the present invention a digital transmitter for transmitting a Quadrature Amplitude Modulation (QAM) signal comprising means for generating an I and a Q data portion from a source of input data, the I portion comprising a plurality of bits, the Q portion comprising a plurality of bits, a first plurality of digital data generators, each digital data generator adapted to receive one of the plurality of bits in the I portion of the input data, a second plurality of digital data generators, each digital data generator adapted to receive one of the plurality of bits in the Q portion of the input data, first multiplying means for multiplying the outputs of the first plurality of digital data generator by a predetermined plurality of weights, second multiplying means for multiplying the outputs of the second plurality of digital data generator by the plurality of weights, a first summer for adding the output of the first multiplying means, a second summer for adding the output of the second multiplying means, a first digital to analog converter coupled to the output of the first summer, the first digital to analog converter for converting the digital output of the first summer into an I analog output signal, a second digital to analog converter coupled to the output of the second summer, the second digital to analog converter for converting the digital output of the second summer into a Q analog output signal and up converter means for performing baseband to radio frequency (RF) conversion on the I analog output signal, the Q analog output signal and a local oscillator signal, the up converter amplifying and transmitting the RF signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| BPSK | Binary Phase Shift Keying |
| D/A | Digital to Analog |
| DSG | Digital Signal Generator |
| EEPROM | Electrically Erasable Programmable Read Only Memory |
| EPROM | Electrically Programmable Read Only Memory |
| FIR | Finite Impulse Response |
| IR | Infrared |
| MPSK | M-ary Phase Shift Keying |
| PROM | Programmable Read Only Memory |
| QAM | Quadrature Amplitude Modulation |
| QPSK | Quadrature Phase Shift Keying |
| RAM | Random Access Memory |
| RF | Radio Frequency |
| ROM | Read Only Memory |

General Description

Figure 1:
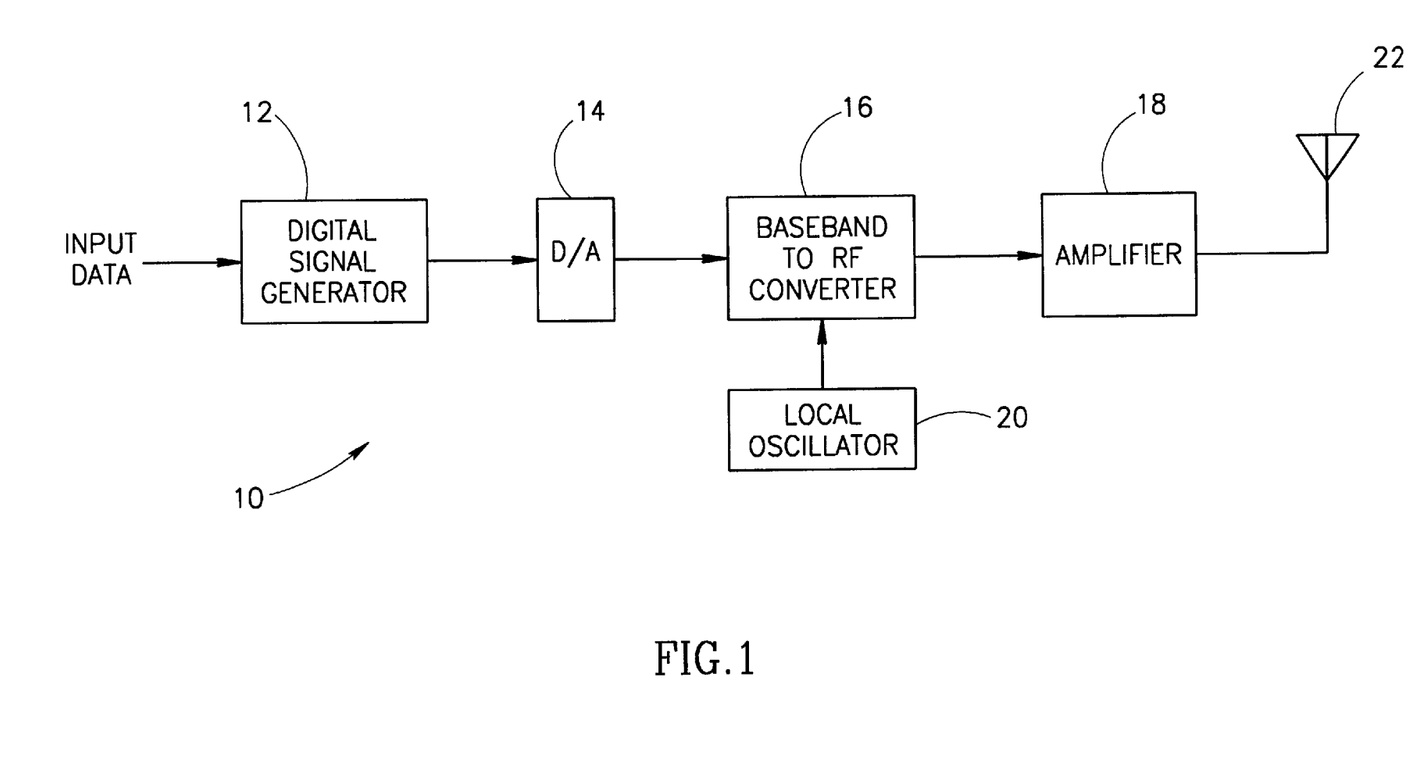
FIG. 1 is a block diagram illustrating an example digital transmitter employing a digital signal generator constructed in accordance with the present invention.

A block diagram illustrating an example digital transmitter suitable for BPSK modulation employing a digital signal generator constructed in accordance with the present invention is shown in FIG. 1. The digital transmitter, generally referenced 10, comprises a digital signal generator 12, a digital to analog (D/A) converter 14, baseband to RF converter 16, an amplifier 18, antenna 22 and a local oscillator 20.

The input data comprises a baseband signal y(t) which is expressed below in Equation 1.

$$y(t) = \sum_{n=-\infty}^{\infty} a_n h(t - nT) \quad (1)$$

wherein T is the symbol time interval, $a_n$ is the data symbol sequence at a symbol rate R=1T and h(t) is the basic transmitted waveform for each symbol. It is important to note that in most modern communication schemes, the transmission waveform h(t) associated with each symbol is typically longer tana the width of the symbol itself. For example, if the symbol time period is represented by T, the transmission waveform may span any number of symbol times, e.g., 3T, 4T, 5T, 6T, 7T, etc. Ideally, it is preferable for each symbol to be transmitted using an infinitely long transmission symbol, but this is not practical in reality.

For the simplest case, $a_n$ is real and binary, i.e., $a_{n=\pm}1$, and h(t) is a real waveform. The transmitter basic waveform h(t) has a duration of 2NT. The signal generated by the digital signal generator and input to the D/A is discrete with $n_s$ samples per input symbol. Note that each input symbol may represent multiple bits or may represent a single bit. In this case, $a_n$ has more than two values. The value of $n_s$ should be greater than or equal to 2 which means the signal output by the digital signal generator should have a minimum rate of 2R samples/symbol in order to satisfy the Nyquist criteria, assuming the bandwidth of the signal is 1/R Hz.

The output of the digital signal generator functions to generate a digital data stream representing the signal to be transmitted. The D/A functions to convert the digital output of the digital signal generator to analog format. The baseband to RF converter modulates the analog signal and shifts it up in frequency in accordance with the frequency of the local oscillator 20. The output of the converter is amplified and input to the antenna 22. The baseband to RF converter may also comprise an uplink modulator which modulates the analog signal for transmission to a satellite. The digital tansmitter may be utilized, for example, with a plurality of stations with each station employing at least one digital transmitter.

Figure 2:
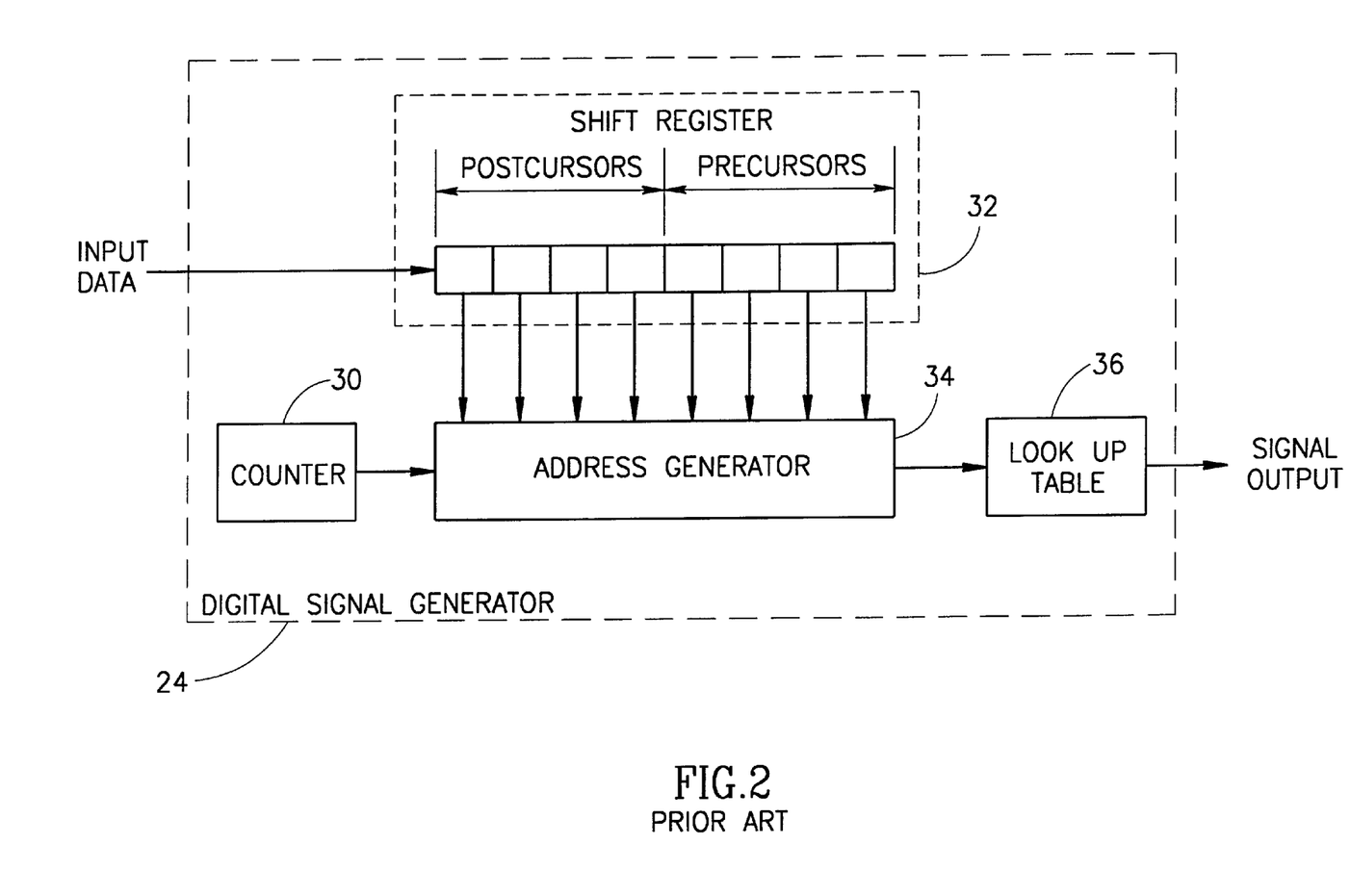
FIG. 2 is a block diagram illustrating a prior art digital signal generator in more detail.

A block diagram illustrating a prior art digital signal generator in more detail is shown in FIG. 2. In this example, the value of N is equal to 4, thus the transmitter basic waveform h(t) has a duration of 8T. The conventional approach to generate the output signal is to calculate the signal samples off-line and to store them in a table. The table may comprise a memory storage device such as a ROM or RAM memory. The input data is a bit stream which is input to a shift register 32. The shift register in this example comprises 8 bits and is divided into two groups of four bits each. The two groups include post cursors and precursors. The middle of the shift register, between the third and fourth bits, represents time t. The waveform to be generated at time t depends on the four bits that came before it, i.e., the precursors, and the four bits that come after it, i.e., the postcursors.

The parallel outputs of the shift register are input to an address generator 34 which also receives the output of a counter 30. The counter functions to count modulo the number of samples per symbol.

Each of the $n_s$ samples making up a symbol depends on 2N symbols (N symbols before it and N symbols after it), therefore the storage required is equal to $n_s \cdot 2^{2N}$. The value $2^{2N}$ represents the number of combinations of the 8 input bits in the shift register that are input to the address generator. For each combination $n_s$ samples must be generated thus yielding $n_s \cdot 2^{2N}$ required locations.

The expression for the signal output by the digital signal generator is shown in Equation 2 below.

$$y(t) = \sum_{n=k-N+1}^{k+N} a_n h(t - nT) \quad (2)$$

for $kT < t < kT+T$. The implementation to generate $y(t)$ is shown in FIG. 2 for the case where N=4. Assuming that the sampling instants are at times $$\frac{iT}{n_s} = kT - \frac{T}{2n_s}$$

for $i=1,2,\ldots,n_s$. If $h(t)=0$ for $|t|>NT$ then the $n_s$ samples in the interval $(kT, kT+T)$ depend on the symbols $a_{k-N+1},\ldots,a_{k+N}$. For example, for N=4, n=0 and $n_s=8$, the 8 samples at time instants $$\frac{iT}{8} + \frac{T}{16},$$

where $i=0, 1, \ldots, n_s-1$, depend on $a_{-3}, a_{-2}, a_{-1}, a_0, a_1, a_2, a_3$ and $a_4$. The values of $y(t)$ are stored in the look up table 36, e.g., a RAM memory device. The values of $y(t)$ correspond to the sampling instants of the basic transmitted waveform.

Digital Signal Generator of the Present Invention

The digital signal generator of the present invention functions to generate a digital output, representing the digitized samples of the output waveform to be modulated by the baseband to RF converter, while reducing the memory storage requirements of the look up table. As the number of samples per symbol and the number of bits per sample increase, the memory storage required also increases.

The digital signal generator of the present invention functions to reduce the amount of memory, i.e., RAM, ROM, etc., required to generate the digital output by splitting the memory storage into two portions. One portion corresponds to the N postcursors and the other portion correspond to the N precursors. Using separate memories for the postcursors and the precursors effectively splits the effect of symbols associated with a sample into the first N symbols that effect the precursors and the second N symbols that effect the postcursors. The effects of the postcursor and the precursor are then summed using an adder.

As described previously, each of the $n_s$ samples per symbol depends on N symbols of the precursor and N symbols of the postcursor. Therefore, the storage required can be expressed as $2 \cdot n_s \cdot 2^N$. The cost of reducing the storage requirements is an adder. An expression for $y(t)$ is give by Equation 3 below.

$$y(t) = \sum_{n=k-N+1}^{k} a_n h(t-nT) + \sum_{n=k+1}^{k+N} a_n h(t-Nt) \quad (3)$$

for $kT<t<kT+T$. The first summation is due to the precursor and the second summation is due to the postcursor.

For the sampling instants $$\frac{iT}{n_s} + kT + \frac{T}{2n_s},$$

the $n_s$ samples in the interval $(kT, kT+T)$ depend on the precursor symbols $a_{k-N+1}, \ldots, a_k$ and post cursor symbols $a_{k+1}, \ldots, a_{k+N}$. For example, for the case when N=4, n=0 and $n_s=8$, the 8 samples at time instants $$\frac{iT}{8} + \frac{T}{16},$$

wherein $i=0, 1, \ldots, n_s-1$ depends on the presecursor data $a_{-3}, a_{-2}, a_{-1}, a_0$ and the postcursor data $a_1, a_2, a_3$ and $a_4$.

Figure 3:
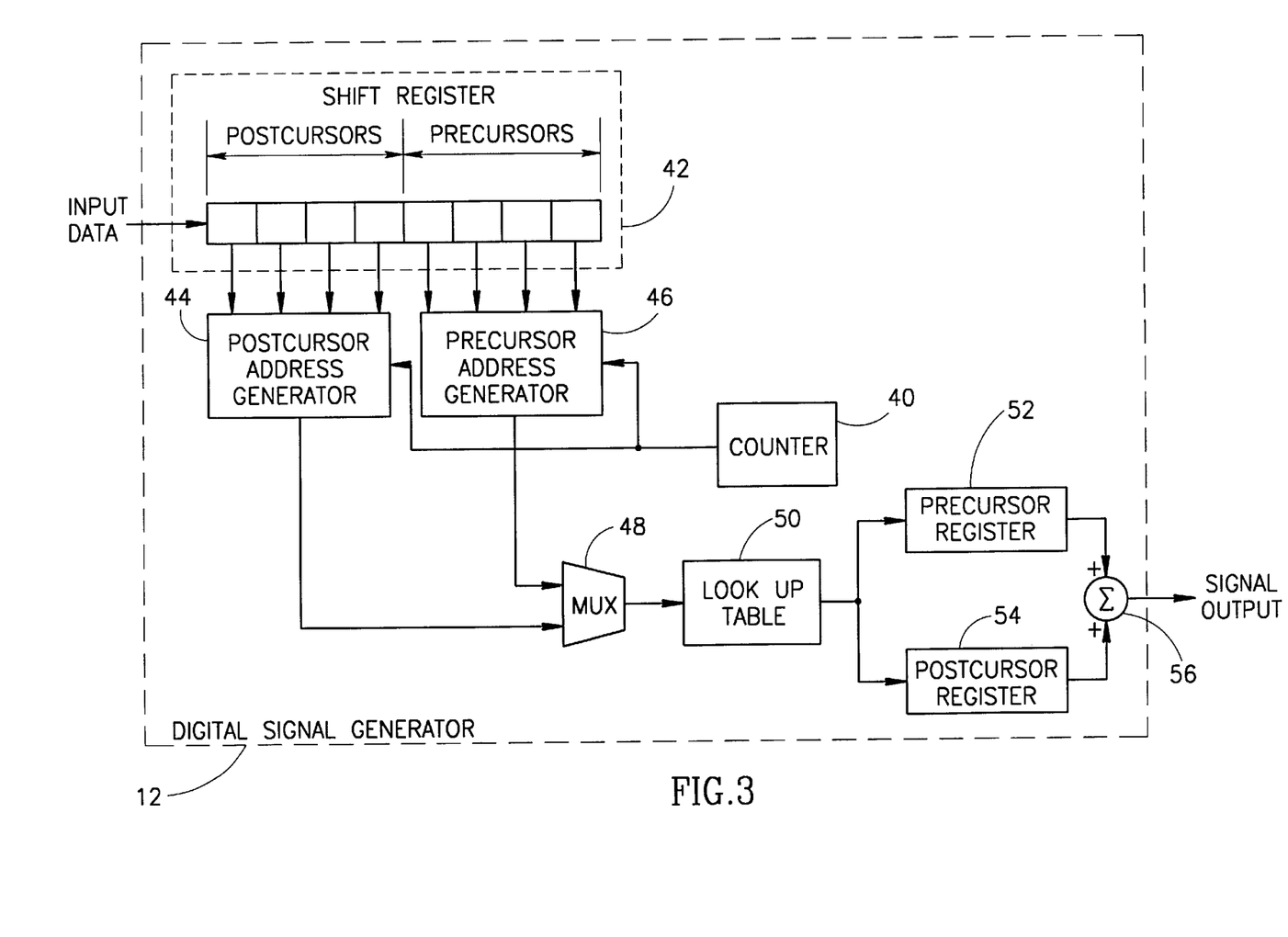
FIG. 3 is a block diagram illustrating the digital signal generator of the present invention.

A block diagram illustrating the digital signal generator of the present invention is shown in FIG. 3. The digital signal generator 12 comprises a shift register 42 having a length equal to 2N and split into a postcursor portion of length N and a precursor portion of length N. The shift register functions to store the input data bits as they are clocked in. The shift register also functions as a delay element wherein each input bit is delayed by one symbol period as it is clocked through the shift register. The input data is input to the shift register and the output bits are ignored. The output of a modulo $n_s$ counter 40 is input to both the postcursor and precursor address generators 44, 46. The counter outputs the current sample number modulo $n_s$.

The postcursor output bits of the shift register are input to the postcurcor address generator 44 and the precursor output bits are input to the precursor address generator 46. The address generator functions to calculate the address to the lookup table as a function of the counter output and the precursor (or postcursor) bits. The lookup table may comprise any suitable memory storage device such as RAM, ROM, PROM, FLASH, EPROM, EEPROM, etc.

The outputs of both the postcurcor and precursor address generators are input to a 2 to 1 multiplexor 48. The multiplexor chooses between the postcursor and precursor address. The output of the mux is then input to a lookup table 50. The lookup table stores the signal samples comprised of contributions of the postcursors and the precursors. The output of the lookup table is stored in a precursor register 52 and a postcurcor register 54. The outputs of the precursor and postcurcor registers 52, 54, representing the signal contributions of the precursor and postcursor responses, are summed by adder 56. The output of the adder 56 forms the signal output of the digital signal generator 12.

The implementation shown in FIG. 3 is for case where N=4, i.e., the basic transmitter waveform has a duration of 2NT. The basic tansmitter waveform is the shaping waveform used to provide the input digital data with suitable spectral properties. The same lookup table is used to generate the samples for the postcurcor and precursor portions of the shift register. The postcurcor and precursor addresses are muxed at a clock rate twice the normal clock rate. In addition, the registers storing the output of the lookup table are also clocked at twice the normal clock rate, i.e., twice per sample period.

Lemma 1

The following Lemma 1 is used to obtain a reduction in the storage requirements for the lookup table. Lemma 1 is based on the symmetry of $h(t)$, i.e., $h(t)=h(-t)$.

Lemma 1: for a symmetric $h(t)$, the contribution of the precursor of $\underline{a}$ on sample i is the same as the contribution of the post cursor $\underline{a}^R$ on sample $n_s-1-i$.

If $\underline{a}$ represents a vector of data symbols of length N and $\underline{a}^R$ represents the vector $\underline{a}$ with the components in the reversed order, it is proved below that for a symmetric h(t), the contribution of the precursor of a on sample i is the same as the contribution of the post cursor $\underline{a}^R$ Ronsample $n_s-1-i$.

Lemma 1 Proof

The proof of Lemma 1 follows. In order to prove this statement, let us consider the precursor given below in Equation 4.

$$y(t) = \sum_{n=k-N+1}^{k} a_n h(t - nT) \quad (4)$$

for kT<t<kT+T. Substituting $$t = \frac{iT}{n_s} + kT + \frac{T}{2n_s},$$

i =0, 1, . . . , $n_s$–1 yields Equation 5.

$$y(t) = \sum_{n''=k-N+1}^{k} a_n h\left(\frac{iT}{n_s} + kT + \frac{T}{2n_s} - nT\right) \quad (5)$$

We then replace k–n=n" to yield Equation 6.

$$y(t) = \sum_{n''=N-1}^{0} a_{-n''+k} h\left(\frac{iT}{n_s} + \frac{T}{2n_s} + n''T\right) \quad (6)$$

$$y(t) = \sum_{n''=0}^{N-1} a_{k-n''} h\left(\frac{iT}{n_s} + \frac{T}{2n_s} + n''T\right)$$

For comparison, let us consider the postcursor given by Equation 7.

$$y(t) = \sum_{n=k+1}^{k+N} a_n h(t - nT) \quad (7)$$

for kT<t<kT+T. Substituting $$t = \frac{iT}{n_s} + kT + \frac{T}{2n_s},$$

wherein i 0, 1, . . . , 8 yields Equation 8.

$$y(t) = \sum_{n=k+1}^{k+N} a_n h\left(\frac{iT}{n_s} + kT + \frac{T}{2n_s} - nT\right) \quad (8)$$

Substituting n' for n–k–1 and using symmetry yields Equation 9.

$$y(t) = \sum_{n'=0}^{N-1} a_{n'+k+1} h\left[\frac{(n_s+1-i)}{n_s} + \frac{T}{2n_s} + n'T\right] \quad (9)$$

A comparison of Equations 6 and 9 with n=n'=n" reveals that the calculation of the precursor contribution and of the postcursor contribution are similar except that (1) i is replaced by n_1–i and (2) the order of the symbols of the precursor and of the postcursor for each n is given by Table 1 below.

TABLE 1

| Shift Register Portion | n | | | |
|---|---|---|---|---|
| | 0 | 1 | . . . | N-1 |
| Precursor | $a_k$ | $a_{k-1}$ | . . . | $a_{k-N+1}$ |
| Postcursor | $a_{k+1}$ | $a_{k+2}$ | . . . | $a_{k+N}$ |

Further reduction in memory storage required for the lookup table can be obtained by using Lemma 2 below.

Lemma 2

Lemma 2: the fact that the contribution of the precursor/postcursor of –a of sample i is minus the contribution of the precursor/postcursor a of sample i. This can be observed from Equation 1 by multiplying both sides by –1. This property can be utilized to require only half the values to be stored in the lookup table. For example, only those precursors/postcursors with $a_k=1$ will be stored. The precursors/postcursors with $a_k=-1$ are then calculated from the stored values.

The storage required after applying Lemma 1 and Lemma 2 can be expressed below as shown in Expression (10).

$$\frac{n_s \cdot 2^N}{2} \quad (10)$$

This value is smaller by a factor of $2^{N+1}$ relative to the prior art classical approach described hereinabove.

Figure 4:
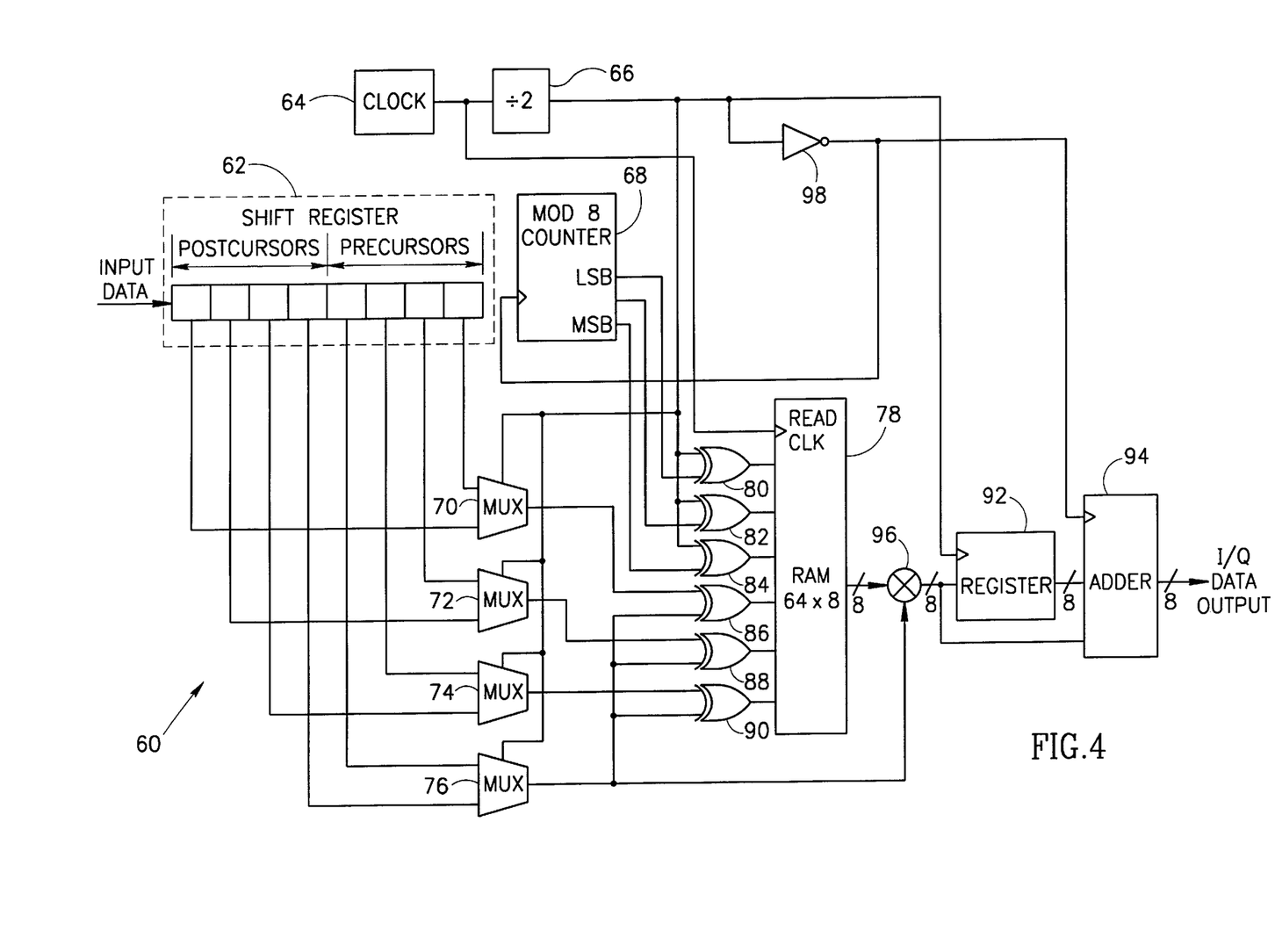
FIG. 4 is a block diagram illustrating the digital signal generator of the present invention in more detail.

A block diagram illustrating the digital signal generator of the present invention in more detail is shown in FIG. 4. The digital signal generator, generally referenced 60, comprises a shift register 62 having postcursor and precursor portions, a clock 64, divide by 2 circuit 66, modulo 8 counter 68, 2 to 1 multiplexors 70, 72, 74, 76, XOR gates 80, 82, 84, 86, 88, 90, RAM lookup table 78, multiplier 96, register 92 and adder 94.

This example digital signal generator is for the case where N=4 and the number of samples per symbol $n_s=8$. The input data, e.g., input I/Q data, is clocked into shift register 62. The shift register comprises the postcursor and precursor which contain Boolean values. The shift register is clocked once every symbol period T. The lookup table 78 comprises memory storage, e.g., RAM, ROM, etc., that contains an 8 bit representation of the precursor response. The counter 68 counts from 0 to 7 yielding 8 samples per symbol period T (for $n_s=8$).

A clock source 64 is used to derive a main clock which drives the lookup table and is also input to a divide by 2 circuit 66. Both non inverted and inverted clock signals are used. An inverter 98 provides the inverted clock signal to the counter 68 and the adder 94. The non inverted clock is provided to the multiplexors and the register. When the clock is low, the precursor response is read from the lookup table, i.e., the control input to the muxes is low. Conversely, when the control input to the muxes is high, the postcursor response is read from the lookup table. At the end of the clock cycle, the precursor response and the postcursor response are summed via adder 94 and form the I/Q data output from the digital signal generator. Note that the main clock is obtained by dividing the clock source 64 by 2 which is used to drive the lookup table clock. Thus, the lookup table is read twice every sample time.

Binary Representation of Data

The data $a_n$ can have the values ±1. The actual logic circuitry used to implement the digital signal generator, however, can represent only the values 0 and 1. Therefore, the Boolean data values 0 and 1 shall be denoted as $b_n$ and are related to $a_n$ in accordance with the following Equation 11.

$$a_n = (-1)^{b_n} \quad (11)$$

Thus, for example, $b_n=0$ corresponds to $a_n=1$ and $b_n=1$ corresponds to $\underline{a}_n=-1$.

Address Generation

The precursor data vector is given by $\underline{a}=a_k, \ldots a_{k-N+1}$ or in Boolean representation as $\underline{b}=b_k, \ldots, b_{k-N+1}$. According to Lenmmas 1 and 2 described above, memory storage is required only for the samples associated with the precursor response, and only for data vectors such that $b_k=0$, i.e., $a_k=1$. The response of the precursors for data vectors wherein $b_k=1$ and the response of the postcursors can be calculated by simple operations from the response stored in the lookup table for the $b_k=0$ precursor response. Thus, the lookup table memory only need contain an 8 bit representation of the precursor response for $b_k=0$.

For precursors represented by data vector $\underline{b}$ with the value $b_k=0$ the address of a sample at sampling time $$\frac{iT}{n_s} + kT + \frac{T}{2n_s},$$

$i=0, 1, 2, \ldots, n_s-1$, is given by $(b_{k-1}, b_{k-2}, \ldots, b_{k-N-1}, i)$ wherein $\underline{i}$ is $i$ expressed in a binary representation. The value stored and read from the lookup table is the precursor response.

For precursors represented by data vector $\underline{b}$ with the value $b_k=1$, the address of a sample at sampling time $$\frac{iT}{n_s} + kT + \frac{T}{2n_s},$$

$i=0, 1, 2, \ldots, n_s-1$, is given by $(\underline{b}_{k-1}, \underline{b}_{k-2}, \ldots, \underline{b}_{k-N-1}, \overline{i})$ where $\overline{z}$ denotes the inverse of $z$. The value read from the lookup table must first be inverted in order to obtain the precursor response.

For postcursors represented by data vector $\underline{b}$ with the value $b_{k+1}=0$, the address of a sample at sampling time $$\frac{iT}{n_s} + kT + \frac{T}{2n_s},$$

$i=0, 1, 2, \ldots, n_s-1$, is given by $(b_{k+2}, b_{k+3}, \ldots, b_{k+N}, \underline{n}_{s+b-1-i})$, where $\underline{n}_{s+b-1-i}$ is $n_s-1-i$ expressed in a binary representation. The value read from the lookup table is the postcursor response.

For postcursors represented by data vector $\underline{b}$ with the value $b_{k+1}=1$, the address of a sample at sampling time $$\frac{iT}{n_s} + kT + \frac{T}{2n_s},$$

$i=0, 2, \ldots, n_s-1$, is given by $(\overline{b}_{k+2}, \overline{b}_{k+3}, \ldots, \overline{b}_{k+N}, \underline{n}_{s+b-1-i})$. The value read from in the lookup table must be inverted in order to obtain the postcursor response.

Note that the 2 to 1 multiplexors function to choose between the precursor and the postcursor portion of the shift register. The XOR gates unction to generate a 6 bit address as function of the output of the counter and the output of the multiplexors. The XOR gates connected to the output of the multiplexors function to invert the address for the precursors having a value $b_k=1$ and for the postcursors having a value $b_{k+1}=1$.

In addition, the XOR gates connected to the counter output function to change the value $i$ to $n_s-1-i$. The multiplier 96 functions to invert the output of the lookup table, e.g., RAM, for precursors having a value $b_k=1$ and postcursors having a value $b_{k+1}=1$. The register 92 is used to temporarily store the precursor response which is to be added to the postcursor response. The adder sums the output of the multiplier with the output of the register, i.e., the postcursor response and the precursor response, at the end of the clock cycle to yield the I/Q data output.

Extension to Non Binary and Complex Signal Generation

A non binary, complex signal can be expressed as given below in Equation 12.

$$y(t) = \sum_{n=-\infty}^{\infty} I_n h(t-nT) + j \sum_{n=-\infty}^{\infty} Q_n h(t-nT) \quad (12)$$

wherein j stands for $\sqrt{-1}$. The terms $I_n$, and $Q_n$ represent QAM signals which take the values $\pm 1, \pm 3, \pm 5, \ldots, \pm(L-1)$, wherein L depends on the constellation size. Alternatively, $I_n$ and $Q_n$ may represent a PSK signal wherein $$I_n = \cos(\phi_n) \quad (13)$$

and $$Q_n = \sin(\phi_n) \quad (14)$$

wherein $\phi_n$, is the transmitted phase that is dependent on the data.

Inspecting the transmitted signal $y(t)$ as expressed in Equation 12 above, one skilled in the signal processing art can extend the principles of the present invention to a complex non-binary signal in a straight forward manner by separately calculating the real and the imaginary components of the complex signal The signal for all possible combinations of $I_n$ and $Q_n$ are calculated and stored and used in the same manner as the lookup table values as scribed hereinabove.

Figure 5:
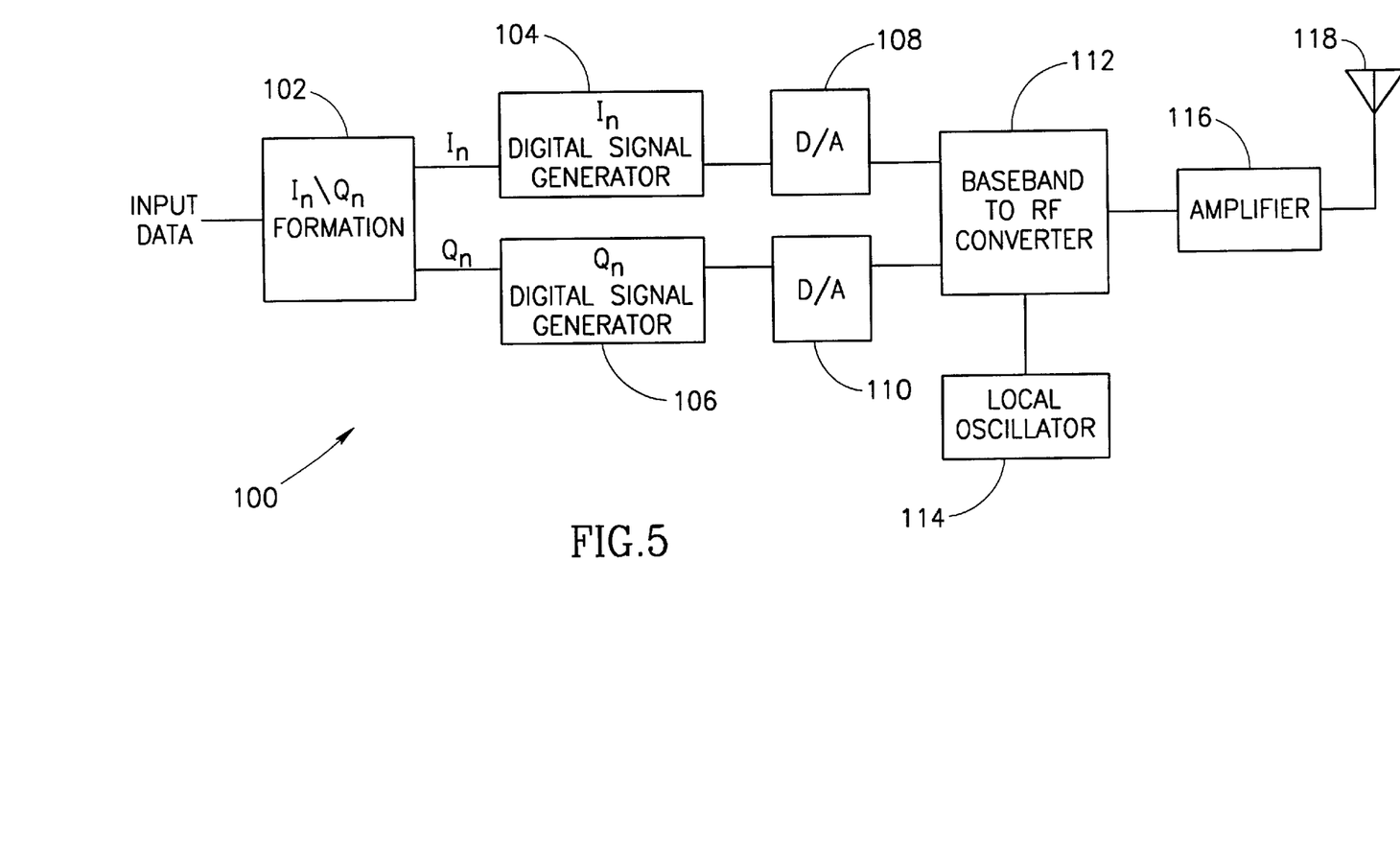
FIG. 5 is a block diagram illustrating a digital transmitter suitable for QPSK modulation employing the digital signal generator of the present invention.

A block diagram illustrating a digital transmitter suitable for QPSK modulation employing the digital signal generator of the present invention is shown in FIG. 5. The digital transmitter, generally referenced 100, comprises $I_n/Q_n$ formation module 102, $I_n$ digital signal generator (DSG) 104, D/A converter 108, $Q_n$ DSG 106, D/A converter 110, baseband to RF up converter 112, local oscillator 114, amplifier 116 and antenna 118.

The extension of the digital signal generator (DSG) of the present invention to QPSK modulation first involves forming the $I_n$ and $Q_n$ data streams. The $I_n$ and $Q_n$ data streams are then processed separately via DSGs 104, 106, respectively. The $I_n$ and $Q_n$ outputs of the DSGs are input to D/A converters 108, 110, respectively, where they are converted to analog signals. The I analog signal is modulated by the local oscillator signal and Q analog signal is modulated by the local oscillator signal shifted by 90 degrees. The modulated signals are combined and output to the amplifier 116 which boosts the signal to a suitable level to be transmitted by antenna 118.

It is important to note that in the QPSK digital transmitter 100, the memory look up tables within each DSG comprise identical content. Thus, a common memory can be used in which both I and Q channels share the memory storage. If a common shared memory is used, the memory storage devices used preferably have multiple ports to support multiple access.

Figure 6:
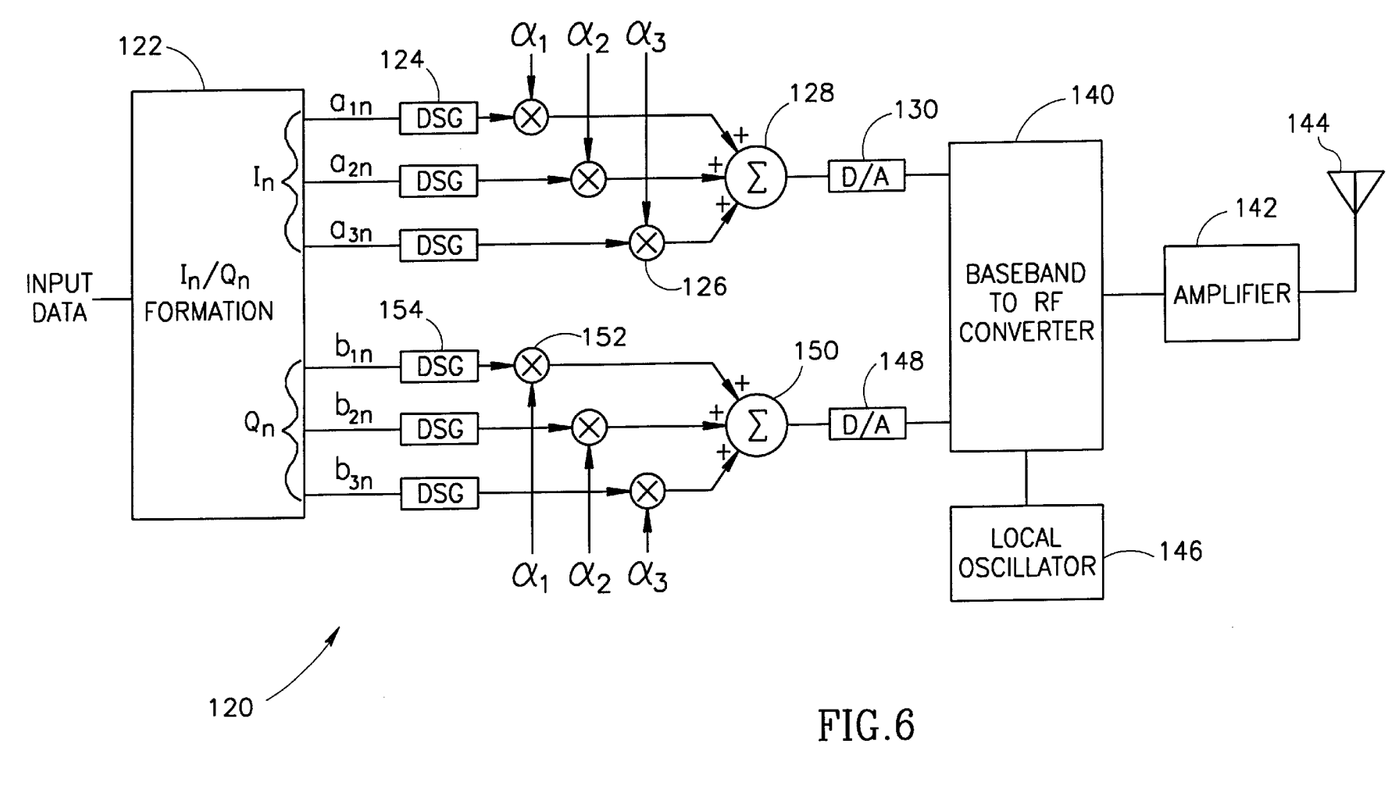
FIG. 6 is a block diagram illustrating a digital transmitter suitable for QAM modulation employing the digital signal generator of the present invention.

The principles of the present invention can further be extended to support QAM modulation. A block diagram illustrating a digital transmitter suitable for QAM modulation employing the digital signal generator of the present invention is shown in FIG. 6. The digital transmitter, generally referenced 120, comprises $I_n/Q_n$ formation module 122, $I_n$ digital DSGs 124, summer 128, D/A converter 130, $Q_n$ DSGs 154, summer 150, D/A converter 148, baseband to RF up converter 140, local oscillator 146, amplifier 142 and antenna 144.

The QAM signal y(t) can be expressed using Equation 12 above. In the case of QAM, however, the bits making up a symbol are split to form I and Q portions. For example, consider 64 QAM wherein each symbol represents 6 bits. The 6 bits of each symbol can be split into 3 bits forming an I portion and 3 bit forming a Q portion. This is illustrated in FIG. 6. A separate DSG is used for each bit of the 6 bits making up each input data word (symbol). An expression for $I_n$ is shown below in Equation 15.

$$I_n = \alpha_1 a_{1n} + \alpha_2 a_{2n} + \alpha_3 a_{3n} \quad (15)$$

where $a_{1n}$, $a_{2n}$, $a_{3n}$ have values ±1 depending on the input data and $\alpha_1$, $\alpha_2$, $\alpha_3$ are weights. The output of the DSGs are multiplied by the weights before being summed by summer 128 with the output of the summer constituting $I_n$. For example, the weights for $\alpha_1$, $\alpha_2$, $\alpha_3$ may be 1, 2, 4, respectively.

Similarly, an expression for $Q_n$ is shown below in Equation 16.

$$Q_n = \alpha_1 b_{1n} + \alpha_2 b_{2n} + \alpha_3 b_{3n} \quad (16)$$

where $b_{1n}$, $b_{2n}$, $b_{3n}$ have values ±1 depending on the input data and $\alpha_1$, $\alpha_2$, $\alpha_3$ are weights. The output of the DSGs are multiplied by the weights before being summed by summer 150 with the output of the summet constituting $Q_n$.

In the general QAM case, multiple DSG units are used for both the I signal and the Q signal. The number of DSG units used depends on the level of QAM used. For 256 QAM, for example, the 8 bit symbol can be split into 4 bits of I associated with 4 DSG units and 4 bits of Q data associated with another 4 DSG units. Note that this is only one possible application, there being numerous variations on QAM modulation schemes.

Note also, that similar to the QPSK example above, all the lookup tables in DSGs 124, 154 have the same content. Either duplicate memories can be used or a common multiple ported memory can be shared among all the DSG units.

In addition, one skilled in the communication arts can extend the principles of the present invention to the case of MPSK where M represents any number, e.g., 4PSK, 8PSK, etc. The digital transmitter illustrated in FIG. 6 can be used for MPSK, the difference being that different values for $\alpha_1$, $\alpha_2$, $\alpha_3$ are used. Note that the case of 2PSK is equivalent to the system shown in FIG. 1.

While the invention has been described with respect to a limited number of embodiments, it will be appreciated that many variations, modifications and other applications of the invention may be made.

What is claimed is:

1. A digital data generator for shaping an input digital data stream in accordance with a shaping waveform to yield a digital output data stream, said digital data generator comprising:

a delay element of length 2N wherein 2N represents the time duration of said shaping waveform, said delay element adapted to receive said input digital data stream and is divided into a precursor portion and a postcursor portion;

an address generator for generating a precursor address in accordance with said precursor portion and a postcurcor address in accordance with said postcursor portion;

a multiplexor for muxing said precursor address and said postcursor address to yield a first lookup address and a second lookup address during each sample cycle;

lookup means operative to output a first value in accordance with said first lookup address and a second value in accordance with said second lookup address;

summing means adapted to sum together said first value and said second value output from said lookup means to yield said digital data output stream; and wherein the number of entries required in said lookup means is equal to $$\frac{n_s \cdot 2^N}{2}$$

where $n_s$ represents the number of samples per symbol;

N represents ½ the number of periods of said shaping waveform.

2. A digital data generator for shaping an input digital data stream in accordance with a shaping waveform to yield a digital output data stream, said digital data generator comprising:

a delay element of length 2N wherein 2N represents the time duration of said shaping waveform, said delay element adapted to receive said input digital data stream and is divided into a precursor portion and a postcursor portion;

an address generator for generating a precursor address in accordance with said precursor portion and a postcurcor address in accordance with said postcursor portion;

lookup means operative to output a first value of a shaping waveform sample in accordance with said first lookup address and a second value of a shaping waveform sample in accordance with said second lookup address;

summing means adapted to sum together said first value and said second value output from said lookup means to yield said digital data output stream; and wherein the number of entries required in said lookup table is equal to $$\frac{n_s \cdot 2^N}{2}$$

where $n_s$ represents the number of samples per symbol;

N represents ½ the number of periods of said shaping waveform.

3. The digital data generator according to claims 1 or 2, wherein said delay element comprises a serial in/parallel out shift register.

4. The digital data generator according to claims 1 or 2, wherein said address generator comprises a precursor address generator and a postcursor address generator.

5. The digital data generator according to claims 1 or 2, wherein said lookup means comprises a memory storage device.

6. The digital data generator according to claims 1 or 2, wherein said lookup table comprises a random access memory (RAM) device.

7. The digital data generator according to claims 1 or 2, wherein said lookup table comprises a read only memory (ROM) device.

8. The digital data generator according to claims 1 or 2, wherein said lookup table comprises a programmable read only memory (PROM) device.

9. The digital data generator according to claims 1 or 2, wherein said lookup table comprises a Flash memory device.

10. The digital data generator according to claims 1 or 2, wherein said lookup table comprises an electrically erasable programmable read only memory (EEPROM) device.

11. The digital data generator according to claims 1 or 2, wherein said lookup table comprises a electrically programmable read only memory (EPROM) device.

12. In a digital transmission system, a method of shaping an input digital data stream in accordance with a shaping waveform to yield a digital output data stream, said method comprising the steps of:

providing a lookup table of stored shaping waveform samples wherein the number of entries required in said lookup table is equal to $$\frac{n_s \cdot 2^N}{2}$$

where $n_s$ represents the number of samples per symbol;

N represents ½ the number of periods of said shaping waveform;

delaying said input digital data stream so as to form a precursor portion and a postcursor portion;

looking up a precursor value from said lookup table in accordance with said precursor portion;

looking up a postcursor value from said lookup table in accordance with said postcursor portion; and summing said precursor value and said postcursor value to yield said digital data output stream.

13. The method according to claim 12, wherein said lookup table comprises a memory storage device.

14. The method according to claim 12, wherein said lookup table comprises a random access memory (RAM) device.

15. The method according to claim 12, wherein said lookup table comprises a read only memory (ROM) device.

16. The method according to claim 12, wherein said lookup table comprises a programmable read only memory (PROM) device.

17. The method according to claim 12, wherein said lookup table comprises a Flash memory device.

18. The method according to claim 12, wherein said lookup table comprises an electrically erasable programmable read only memory (EEPROM) device.

19. The method according to claim 12, wherein said lookup table comprises a electrically programmable read only memory (EPROM) device.

* * * * *